Patented Mar. 1, 1932

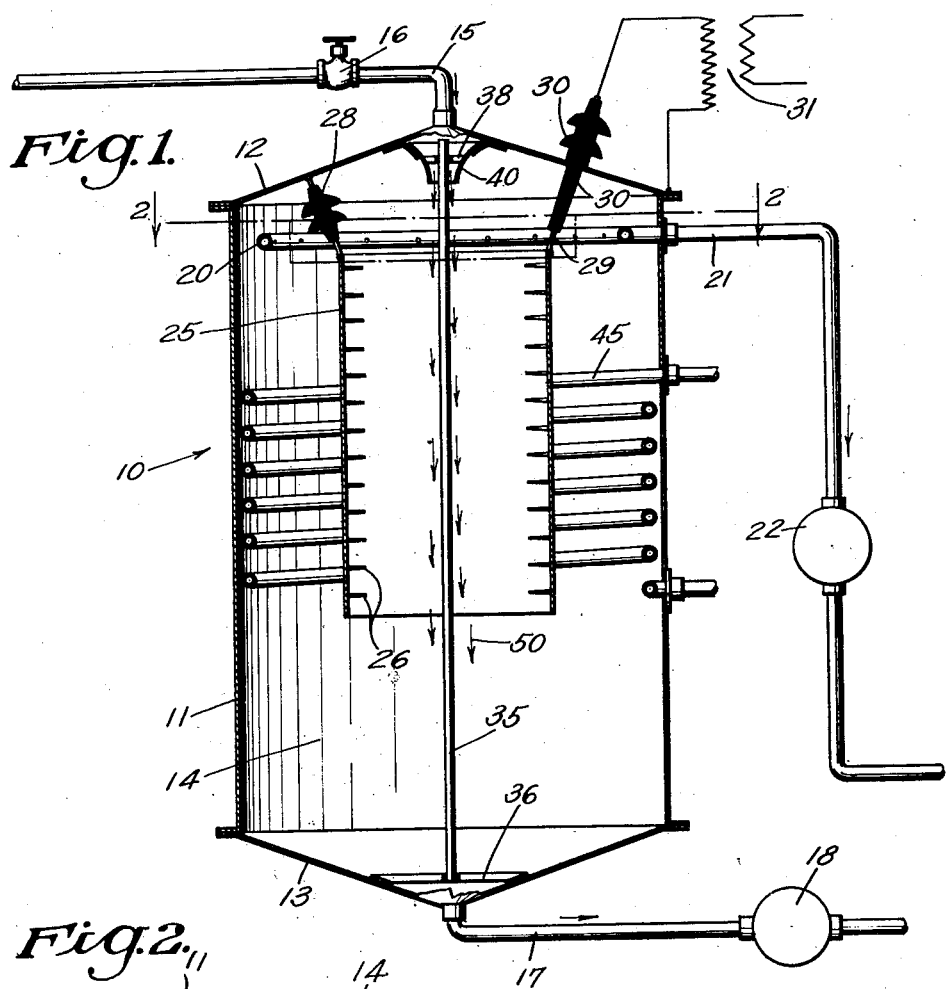

1,847,602

UNITED STATES PATENT OFFICE

HAROLD C. EDDY, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA

METHOD OF AND APPARATUS FOR TREATING OIL UNDER VACUUM

Application filed July 10, 1928. Serial No. 291,513.

My invention relates to the art of separating a substance from a fluid.

While my invention is useful in treating many different fluids for separating a substance therefrom, it is particularly useful in separating the phases of an emulsion.

Crude petroleum, as produced from many wells, is in the form of an emulsion with another liquid, which is generally water. The petroleum must be separated out of this emulsion to be commercially valuable. One method in general use for this purpose involves passing the emulsion through an electric field of fairly high potential. Successful operation of this method requires that some means be employed to break up short-circuiting chains of fluid particles that form in this field as the treatment progresses.

It is an object of my invention to provide a novel process of and apparatus for electrically treating fluids in which the formation of short-circuiting chains is substantially prevented.

In most of the methods at present employed for separating the phases of an emulsion the difference in specific gravities of the continuous and dispersed phases is a factor in the speed of separation.

It is another object of my invention to provide a process of and apparatus for separating the phases of an emulsion or the constituents of a mixture in which the speed of separation is increased beyond that possible with the normal difference in specific gravities of said phases or constituents.

Further objects and advantages will be made manifest in the following description and accompanying drawings in which,—

Fig. 1 is a diagrammatic vertical sectional view illustrating the preferred embodiment of the apparatus of my invention.

Fig. 2 is a horizontal sectional view taken on the line 2—2 of Fig. 1.

Referring specifically to the drawings, a preferred form of the fluid treater 10 is shown as including a shell 11 closed at its upper end by a cover-plate 12 and at its lower end by a floor-plate 13. The shell 11 and the plates 12 and 13 form a substantially fluid-tight container enclosing a fluid treating chamber 14. Connected with the cover-plate 12 to supply emulsion to the chamber 14 at the extreme upper end is a pipe 15 having a valve 16. Connected to the lowermost point of the floor-plate 13 is a water withdrawal pipe 17 having a wet vacuum pump 18. Disposed in the upper end of the chamber 14 is a perforated oil withdrawal pipe 20 which connects through a pipe 21 to a wet vacuum pump 22. Disposed centrally in the chamber 14 just below the perforated pipe 20 is a live electrode 25 in the form of a tube having a large number of spikes 26 extending inwardly therefrom. One side of the electrode 25 is supported from the cap 12 by an insulator 28, while the other side of the electrode is supported by an electrical conductor 29 which extends through an insulator 30 provided in the cover-plate 12 and secured in fluid-tight relationship therewith, said conductor being connected to one terminal of the secondary of a transformer 31, the other terminal of the secondary being grounded to the shell 11. The transformer 31 is supplied with electric current from any suitable source.

Disposed centrally in the chamber 14 and extending axially through the tubular electrode 25 is a rod-like, grounded electrode 35 supported at its lower end by a spider 36 and mounted on the floor-plate 13, and at its upper end by a spider 38 mounted on a conoidal nozzle member 40 which is secured with its end of largest diameter positioned close to the under surface of the cap 12 in axial alignment with the emulsion inlet pipe 15.

Disposed in the chamber 14 just within the shell 11 at a point midway between the upper and lower ends thereof is a heating coil 45 which is adapted to be supplied with steam or some other heating fluid for the purpose of heating liquid in the treating chamber 14 adjacent to this coil. The specific position of this heating coil with respect to the electrode 25 is not a part of the present invention, this feature being claimed in certain copending applications.

The operation of my invention when used in dehydrating a petroleum and water emulsion is as follows: The chamber 14 having been filled with a dielectric liquid, the transformer 31 is energized so as to set up a field of high potential between the electrode 25 and the electrode 35. The pumps 22 and 18 are now set in operation so as to decrease the absolute pressure in the chamber 14. The valve 16 is now opened slightly and emulsion is drawn through the pipe 15 and discharged downwardly through the nozzle member 40, so that this emulsion follows the path indicated by arrows 50. In other words, emulsion clings fairly close to the electrode 35 where the electric field is of greatest intensity, thereby subjecting the emulsion to the maximum effect of this field. While this method of introduction has been found to be particularly valuable in combination with a vacuum treating process, it should be understood that I am not limited thereto. This method of introduction is broadly claimed in a co-pending application filed by Harmon F. Fisher on September 16, 1926, Serial No. 135,804.

As the emulsion passes downwardly through the electric field between the electrodes 25 and 35, the particles of water and other liquid comprising the dispersed phase of the emulsion coalesce into large drops, then form larger bodies of liquid, which, being heavier than the oil comprising the continuous phase of the emulsion, settle downwardly into the lower end of the chamber 14 and are drawn out by the pump 18. The oil separated from the emulsion rises upwardly between the electrode 25 and the shell 11 to the upper end of the treating chamber 14 where it is drawn off through the perforated pipe 20 by the pump 22.

This method of de-emulsifying an emulsion at a pressure below atmospheric produces a much quicker separation of the phases than a de-emulsifying action under pressure. This is probably due to a number of different causes. One possible cause lies in the fact that the emulsion particles contain entrapped gas which upon being subjected to heat expand rapidly. When heated at a pressure less than atmospheric, this action is increased and the expansion is much greater than when the fluid is confined to either atmospheric pressure or held under a pressure. This rapid expansion of the emulsion particles causes an internal pressure at the emulsion interface. When the emulsion is subjected to the influence of the electric field a much more rapid agglomerating action is obtained under vacuum than at a pressure equal to or above atmospheric pressure, and this is true regardless of whether or not the phases are allowed to separate in a vacuum, so that the step of agglomerating under a vacuum has utility aside from its use with the step of separating the phases under a vacuum and vice versa.

Another cause is the normal change in density which takes place when oil and water are each simultaneously subjected to decreasing pressures and increasing temperatures. Under these conditions the oil will expand relatively more than water, thus tending to increase the difference in specific gravities between the oil and water, thus greatly accelerating the separating action.

Another feature of my invention is the controlling of absolute pressure in the chamber 14 by the adjustment of the valve 16 in the emulsion inlet line 15.

While I have shown but a single embodiment of the apparatus of my invention and described the method of my invention as being applied merely in the dehydration of petroleum and water emulsions, it is to be understood that this method may have many other uses than the one disclosed, and that the apparatus and method may both be modified to meet varying conditions without departing from the spirit of the invention as herein disclosed and as set forth in the appended claims. Nor should it be understood that the steps of agglomerating and settling under vacuum must be carried out in combination, for these steps find utility in themselves as well as in combination, though when carried out in the same container, or as successive steps of a process, the joint action produces a superior process.

I claim as my invention:

1. A process of dehydrating petroleum emulsions which comprises: pulling the emulsion into a closed tank from which all air has been previously excluded and maintaining the fluid at less than atmospheric pressure in the tank; and causing electric discharges to take place in the tank sufficient to break the emulsion and separate the oil and water thereof.

2. A process of separating the phases of an emulsion, said phases being of such a nature that the difference in their specific gravities increases when they are subjected to heat and a decrease in pressure, which process comprises: passing said emulsion into an electric field in a closed container held at a pressure lower than atmospheric; and heating the interior of said container to increase the difference in specific gravities of the phases of the emulsion.

3. In a dehydrator, the combination of: walls forming a substantially fluid-tight container; an insulator extending through said walls in fluid-tight relationship therewith; an electrical conductor extending through said insulator; an electrode supported in said container and electrically connected to said conductor; means for introducing emulsion into said container so as to pass through an electric field bounded on one said by said electrode, said field causing a separation of the phases of said emulsion; and suction means for holding the interior of said container under a partial vacuum during the electric treatment of said emulsion.

4. A combination as defined in claim 3 in which said suction means also withdraws at least one of said phases from said container.

5. A combination as defined in claim 3 in which said means for introducing said emulsion into said container includes valve means for restricting the flow of emulsion.

6. A de-emulsifier comprising: walls forming a treating chamber; a rod-like grounded electrode extending longitudinally through said chamber; a tubular live electrode surrounding said grounded electrode; means for introducing an emulsion into said chamber about one end of said rod-like electrode in a stream which flows in a path close to said rod-like electrode and through said live electrode; and suction means for withdrawing separated phases of said emulsion from said chamber and holding said chamber under a pressure lower than atmospheric.

7. A combination as in claim 6 in which means are provided for heating one of said phases as it passes between said live electrode and certain of said walls.

8. A process of separating the phases of an emulsion, which includes the step of electrically treating said emulsion at a pressure below atmospheric to effect the coalescence of a phase thereof.

9. A process of separating the phases of an emulsion, which includes the steps of: subjecting said emulsion to the action of an electric field in the presence of a partial vacuum to agglomerate the particles forming the dispersed phase of said emulsion; and separating said agglomerated particles from the material forming the continuous phase of said emulsion in the presence of a partial vacuum.

10. In a dehydrator, the combination of: a container; means for setting up an electric field in said container; means for supplying the fluid to be treated to said electric field; and suction means for lowering the pressure inside said container to a value below atmospheric pressure.

11. In a dehydrator for separating phases of an emulsion, the combination of: a container; means in said container for agglomerating the particles of the dispersed phase of the emulsion whereby these dispersed particles tend to gravitationally separate from the material forming the continuous phase; a vacuum pump communicating with one end of said container for withdrawing said continuous phase therefrom; and another vacuum pump communicating with another portion of said container and withdrawing the agglomerated material therefrom.

12. A method of separating the phases of an emulsion, one of these phases containing gas, which method includes the steps of: subjecting the emulsion to the action of an electric field; and expanding the gases in the gas-containing phase to decrease the surface tension of this phase.

13. A method of separating the continuous and dispersed phases of an emulsion, the dispersed phase of which contains entrapped gas, which method includes the step of expanding said entrapped gas in said dispersed phase while said emulsion is under the influence of an electric field.

In testimony whereof, I have hereunto set my hand at Los Angeles, California, this 3rd day of July, 1928.

HAROLD C. EDDY.